United States Patent Office 2,955,180
Patented Oct. 4, 1960

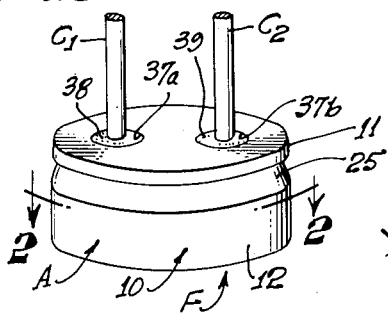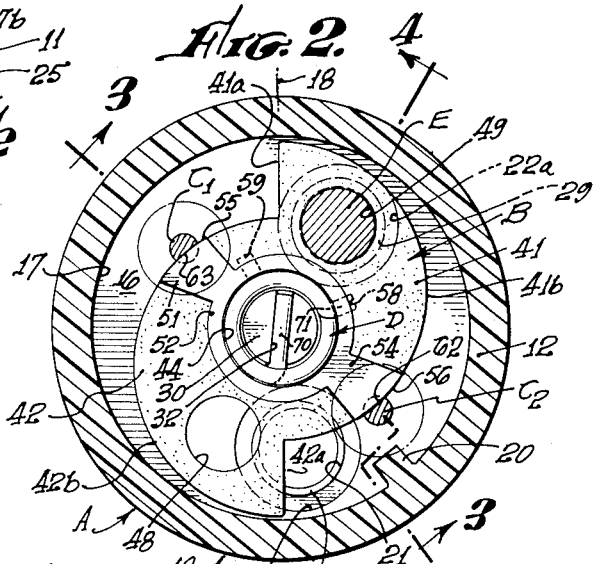

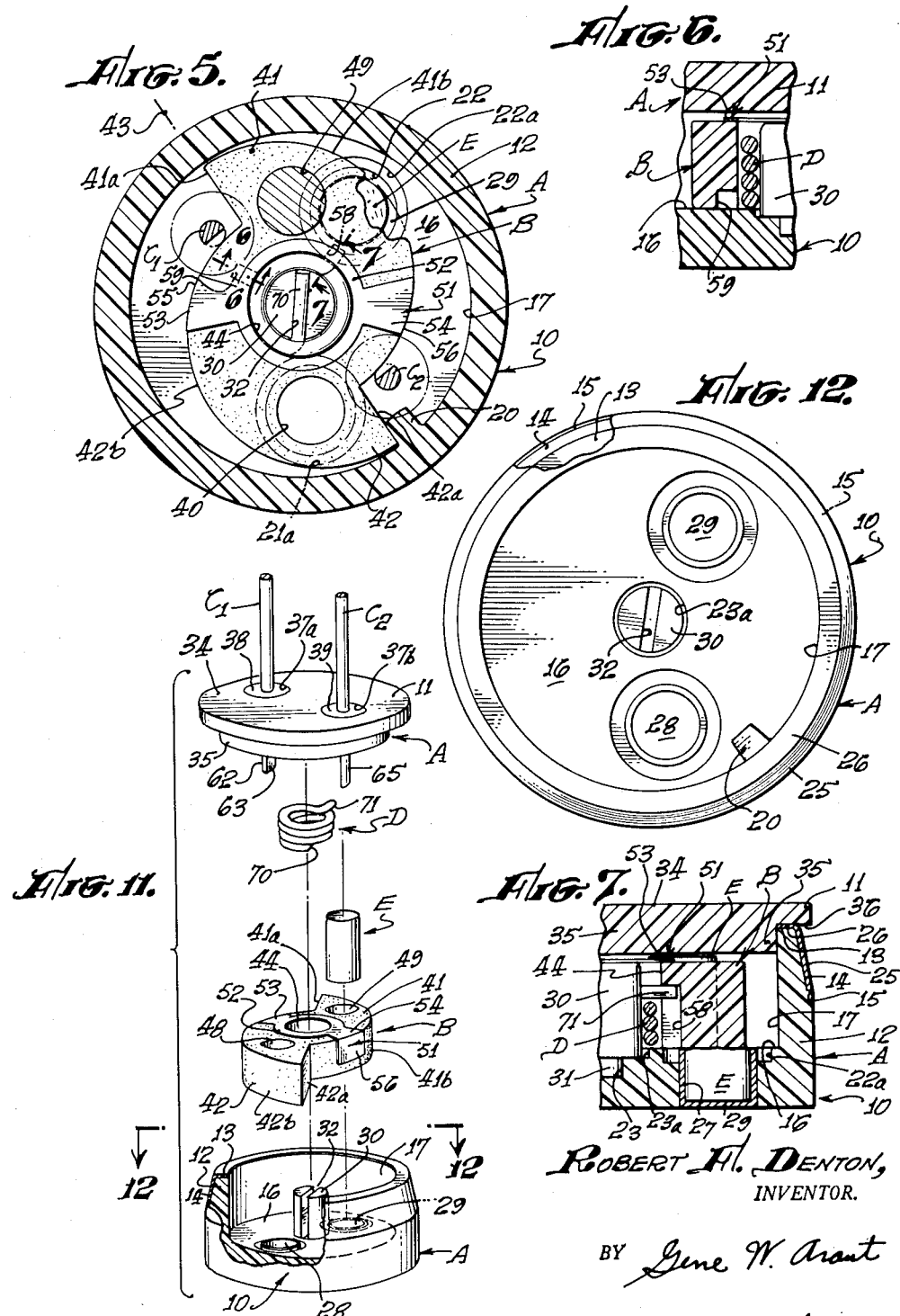

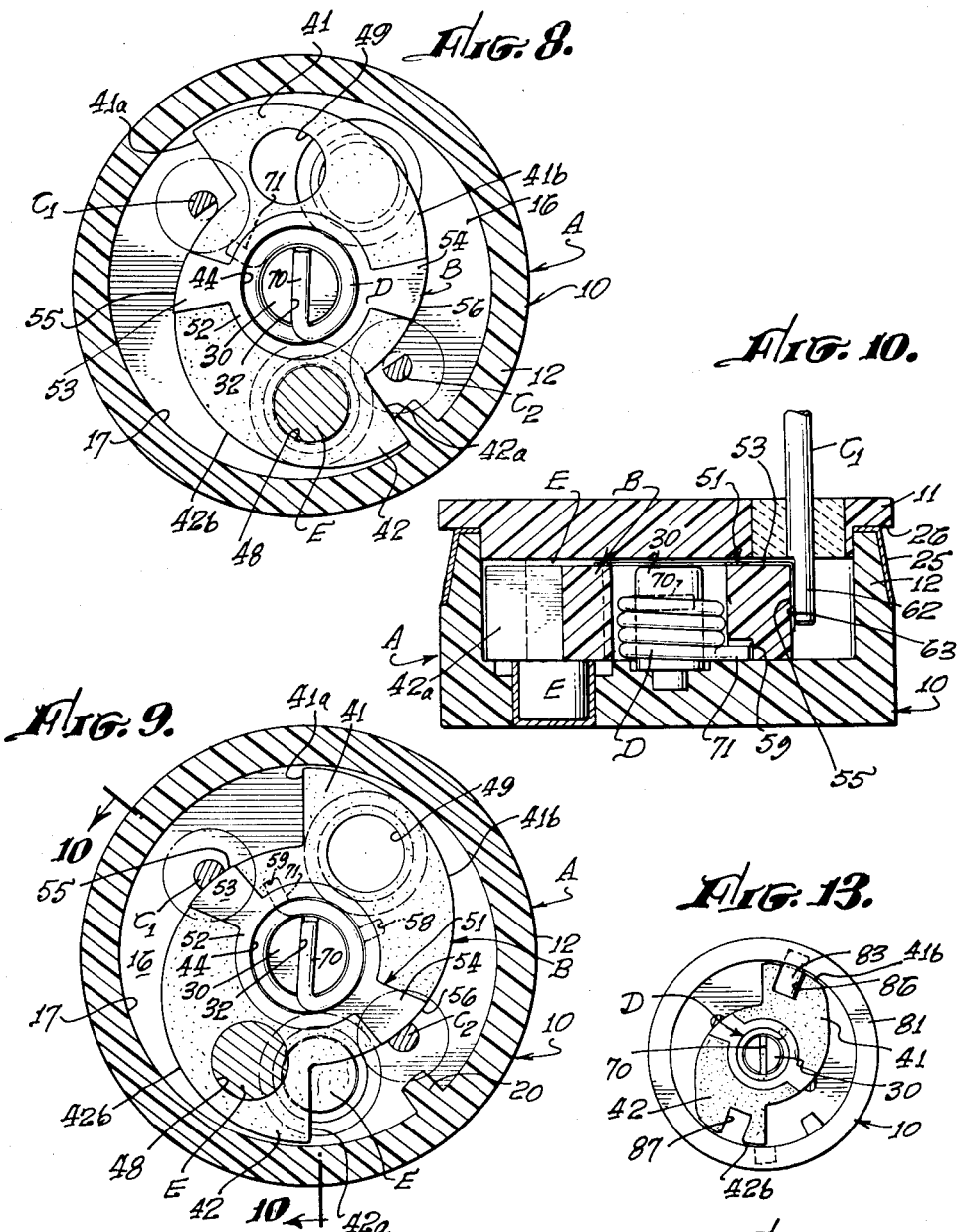

---

2,955,180

SINGLE-ACTION ELECTRICAL SWITCH UTILIZING SHEAR-RESISTANT TEMPERATURE-SENSITIVE PELLET

Robert F. Denton, Los Angeles, Calif., assignor to Jamieson Laboratories, Inc., a corporation of California Filed Feb. 16, 1959, Ser. No. 793,603

8 Claims. (Cl. 200—142)

The present invention relates to a temperature-sensitive electrical switch of the single-action type, in which a movable element moves from its initial position to an alternate position for accomplishing a desired switching action in response to the occurrence of a predetermined temperature condition.

In the prior art it has been well known to employ a fuse which is connected in series in an electrical circuit and which operates to open the circuit when the current flowing therein rises above a predetermined magnitude. Various switches and control devices have also been widely utilized for the purpose of either opening or closing an electrical circuit in response to a condition external to the circuit itself.

A fairly recent development is the single-action switch, which is usable only once. These devices are useful primarily for safety purposes and are similar to the standard fuse in that respect. However, unlike the fuse, the devices may be built either to selectively open a circuit or to selectively close a circuit. Furthermore, these devices, unlike the fuse, operate in response to an external condition rather than a condition within the circuit itself.

Devices of the single-action type are shown, for example, in U.S. Patent #2,683,201 issued July 6, 19454, in U.S. Patent #2,757,259 issued July 31, 1956, and in U.S. Patent #2,777,034 issued January 8, 1957. The devices illustrated in those patents, and modifications thereof employed by the industry, have utilized a longitudinally movable element to accomplish the desired switching action. These devices are generally of miniature size and are required to withstand severe environmental conditions.

In the last several years various temperature-sensitive compounds have been developed which have become useful for electrical switching purposes. These compounds are usually prepared in the form of pellets, or tablets, which are structurally rigid until a predetermined elevated temperature is reached, and which then liquify very rapidly. The accepted manner of using a pellet of this type heretofore has been to clamp it between a pair of jaws which maintain a compressive force upon the pellet. When the proper temperature level is reached and the pellet melts, the closing of the jaws actuates the electrical switching operation.

An important field of application of temperature-sensitive single-action switches is in aircraft and missiles. In the complex electronic circuitry associated with aircraft and missiles it is often desirable to selectively open a circuit, or to selectively close a circuit, in response to a predetermined environmental temperature condition. Reliability of the switching device is of utmost importance, and, in general, the reliability factor which is required is of the order of 99.99% An inherent problem of aircraft and missile equipment is the possibility of failure induced by mechanical shock, or by mechanical vibrations which are permitted to accumulate energy at one or more resonant vibration frequencies characteristic of the apparatus.

An object of the invention, therefore, is to provide an improved single-action switch for selectively opening or closing an electrical circuit in response to an external condition.

An additional object of the invention is to provide an improved single-action switch which utilizes a temperature-sensitive pellet in a novel manner.

Another object of the invention is to provide an improved single-action switch which is responsive to a temperature condition external to the electrical circuit in which the switch is connected.

A further object of the invention is to provide a single-action switch utilizing rotary movement of the switching element.

Yet another object of the invention is to provide a single-action switch, is inexpensive to manufacture, and whose component parts may be assembled in either of two configurations so as to either selectively open or selectively close an electrical circuit.

Still another object of the invention is to provide a tempertaure-responsive single-action switch which is small, rugged and extremely reliable in operation.

According to the invention it is recognized that a temperature-sensitive pellet may be subjected to a shearing force by a pair of laterally relatively movable retaining members, and that the pellet will reliably respond to the shearing force when the predetermined temperature is reached.

The invention has also recognized the fact that a switching device utilizing a rotor biased by a torsion spring is inherently less subject to induced vibrations than other types of switching devices.

Another feature of the invention is that a single set of parts may be used to manufacture either a normally-open switch, or a normally-closed switch, as may be desired.

In its presently preferred form the invention utilizes a substantially cylindrical housing assembly having closed ends, and a rotor which is rotatably supported within the housing assembly. An aligned pair of eccentrically located holes or recesses are provided in the rotor and the housing assembly, respectively. The temperature-sensitive pellet is placed within the holes or recesses for retaining the rotor in its initial position. A torsion spring concentrically positioned with respect to the rotor is biased to urge the rotor toward an alternate position when the application of heat causes the pellet to melt.

The above and other objects of the invention will be more readily apparent from the following description in conjunction with the accompanying drawings, in which:

Figure 1 is a perspective view of the invention;

Figures 2 through 7, inclusive, illustrate the invention with its component parts assembled in one configuration for selectively opening an electrical circuit;

Figure 2 is a plan view of the invention taken on the line 2—2 of Figure 1 and shows the operating parts in the normally-closed switch position;

Figure 3 is a cross-sectional elevational view of the device taken on the line 3—3 of Figure 2;

Figure 4 is a cross-sectional elevational view of the device taken on the line 4—4 of Figure 2;

Figure 5 is a plan view of the device, like Figure 2, but showing the position of the parts after the switch has opened;

Figure 6 is a partial cross-sectional elevational view taken on the line 6—6 of Figure 5;

Figure 7 is a partial cross-sectional elevational view taken on the line 7—7 of Figure 5;

Figures 8 through 10, inclusive, illustrate the invention

3 with its component parts assembled in another configuration so as to selectively close an electrical circuit;

Figure 8 is a plan view of the invention showing parts in the normally-open switch position;

Figure 9 is a plan view of the invention, like Figure 8, but illustrates the position of the parts after the switch has closed;

Figure 10 is a cross-sectional elevational view of the invention taken on the line 10—10 of Figure 9;

Figure 11 is an exploded perspective view of the invention illustrating its various component parts;

Figure 12 is a plan view of the housing base assembly taken on the line 12—12 of Figure 11; and Figure 13 illustrates an alternate arrangement of the pellet-retaining recesses.

Before describing in detail the structure of the invention as illustrated in the drawings it will be advantageous to summarize the principal features of the structure and operation of the invention.

The basic feature of the present invention is the application of a shearing force to a temperature-sensitive pellet. Melting of the pellet occurs at a predetermined elevated temperature level, and permits lateral relative motion of a pair of parallel retaining members by which the shearing force is applied.

In its presently preferred form the invention comprises a fixed housing assembly, a rotor rotatably supported by the housing assembly for movement from one to another of two possible positions, and electrical contact means carried by the rotor and the housing assembly for making or breaking an electrical circuit. An aligned pair of eccentrically located holes or recesses are provided in the rotor and the housing assembly, respectively, and a temperature-sensitive pellet is disposed within the holes or recesses for normally retaining the rotor in its initial position. A biased torsion spring tends to urge the rotor from its initial position toward its alternate position. Finally, means are provided for applying heat to the pellet to raise it to a melting temperature, so as to permit the rotor to rotate and thus to accomplish a unilateral switching action.

A particular feature of the invention in its presently preferred form is that the same set of parts may be utilized to make either a normally-open switch or a normally-closed switch. More specifically, two pairs of eccentrically located holes are provided, one hole of each pair being in the rotor and the other hole being in the housing assembly. One pair of holes are aligned only in the closed-circuit position of the rotor while the other pair are aligned only in the open-circuit position. The spring is interengageable with the rotor and the housing assembly in either of two configurations—one for forcing the rotor from the open-circuit position to the closed-circuit position, the other for forcing the rotor from the closed-circuit position to the open-circuit position. In assembling the device the desired initial position of the rotor is selected, the spring is inserted in its corresponding configuration, and the temperature-sensitive pellet is inserted into the pair of holes which are then aligned.

Referring now to Figures 1 through 12 of the drawings, a housing assembly A contains the rotor B which is held in an initial position by pellet E disposed in a pair of aligned holes. Pellet E opposes the force of a spring D which tends to rotate the rotor toward its alternate position. A pair of electrical conductors $C_1$ and $C_2$ supported by housing assembly A make electrical contact with a conductor portion 51 of rotor B in one position of the rotor, but not in the other position.

Referring specifically now to Figure 11 it will be seen that housing assembly A includes a substantially cup shaped base portion 10 and a lid portion 34 which fits over the top of the cup. Conductors $C_1$ and $C_2$ project downwardly through the lid portion so that their lower ends extend within the housing assembly.

The detailed construction of base portion 10 of housing

4 assembly A may best be understood by referring concurrently to Figures 4 and 12. A flat circular bottom plate 11 is integrally formed with an upwardly extending cylindrical side wall 12. Side wall 12 on its upper edge forms a flat annular shoulder 13 whose width is about one-half the basic wall width, and the outer edge portion of the wall tapers downwardly at 14 to provide a narrower shoulder 15 extending circumferentially about the outer mid-portion of the wall. The flat upper surface of bottom plate 11 is designated as 16, while the cylindrical inner surface of side wall 12 is designated as 17.

Bottom surface 16 has a smooth bore 23 formed at the center thereof, the upper end of the bore being enlarged at 23a. Eccentrically located holes 21 and 22 extend through bottom portion 11 and have enlarged upper portions 21a and 22b, respectively. The two holes are circumferentially spaced about 145 degrees apart as shown in Figure 12. A stop 20 for controlling rotor movement is provided by vertically extending ridge portion on wall surface 17. Stop 20 is located adjacent hole 21, in a direction nearest to hole 22.

Base portion 10 of the housing assembly is fitted with certain accessory parts as follows. A conical ring 25 is compression-fitted over tapered wall portion 14 and at its upper end has an inwardly extending circular flange 26 which seats firmly on top shoulder 13. A pair of eyelets 28, 29 are inserted in holes 21 and 22, respectively. Each eyelet is adapted to receive the pellet E, and is made of metal so as to efficiently transmit heat to the pellet. An elongated cylindrical mounting pin 30 has on its lower end a stub 31 which is received in the center bore 23. A small portion of mounting pin 30 is received in enlargement 23a of the center bore, and a transverse slot 32 extends upwardly through the remaining length of the pin.

Base portion 10 is made of an insulating material such as alumina. Eyelets 28, 29 and mounting pin 30 are rigidly fastened in position, as by brazing.

It is convenient to refer to base portion 10, ring 25, eyelets 28 and 29, and mounting pin 30 as together constituting the housing base assembly. This assembly is illustrated at the lower part of Figure 11 and in Figure 12. Housing assembly A further includes the lid 34, which will now be described in detail.

Lid 34 is a flat circular plate which has a downwardly extending portion 35 of smaller diameter formed integrally therewith. An annular shoulder 36 is thus formed on the lower circumferential edge of the lid 34. Holes 37a, 37b are formed in plate 34—35 and are symmetrically located on opposite sides of the center thereof. Insulating beads 38, 39 carried by the holes 37a, 37b receive corresponding conductors $C_1$, $C_2$.

Eyelets 28, 29 are metal cups, each having an outwardly flanged upper edge received by the enlarged upper portion of the corresponding hole so that the flat bottom of the cup is substantially flush with the under surface of bottom plate 11. While the eyelets have been described as constituting a part of the housing assembly, they may also be viewed as separate elements of the overall combination of the invention, since they perform the special function of transmitting heat from an external source in order to melt the pellet.

Rotor B comprises a flat plate which, however, is cut in the form of a pair of semi-circular segments 41, 42 which are unsymmetrically joined together at their respective diameters. More specifically the two plate segments occupy the same plane, but about one-quarter of the diametral length of each extends beyond the adjoining diametral portion of the other segment. The vertical surface of the extending diametral portion of segment 41 is identified as 41a while the corresponding surface of segment 42 is identified as 42a. A center hole 44 is formed in the rotor at the center of the adjoining portion of the two segments. Thus, with respect to rotation of rotor B about center hole 44, the curved peripheral edges of segments 41, 42 provide a cam action. The curved edges of segments 41, 42 are identified as 41b, 42b, respectively. Rotor B is made of an electrical insulating material.

Rotor B has a pair of symmetrically located holes 48, 49 formed therein for receiving the pellet E. Hole 48 and segment 42 are aligned with eyelet 28 when the switch is open (see Figures 5 and 8). Hole 49 in segment 41 is aligned with eyelet 29 when the switch is closed (see Figures 2 and 9).

Conductive portion 51 of rotor B includes a ring-shaped coating 52 of conductive material on the upper surface of the rotor surrounding center hole 44, a strip 53 of coating material extending across the top of segment 42, and a strip 55 of coating material extending down surface 42b of segment 42. Strips 54, 56 of coating material are symmetrically disposed on the corresponding surfaces of rotor segment 41. In the closed position of the switch (see Figures 2 and 9) conductors $C_1$ and $C_2$ engage coated surfaces 55 and 56, respectively. The space between conductors $C_1$ and $C_2$, the size and shape of the rotor, and the position of conductive portion 51 thereof, are such that when the rotor is rotated clockwise (as viewed from above) the conductors tightly engage surface portion 55, 56 due to the cam action of the rotor. The lower end of each conductor is reamed to provide a good contacting surface, for example, lower end 62 of conductor $C_1$ has a flat-reamed vertical surface 63 facing toward the center of the housing assembly.

Rotor B on its under surface has two slots 58, 59 formed therein which open into center hole 44. Slot 58 is near the middle of rotor segment 41 and runs vertically almost the entire thickness of the rotor (see Figure 3), while slot 59 is located in segment 42 between conductive coating strip 53 and the surface 41a of segment 41. Slot 59 is relatively shallow (see Figure 10). Spring D has an end 70 which is bent to extend outwardly. Inner end 70 of the spring engages slot 32 of mounting pin 30, while outer end 71 of the spring engages either slot 58 or slot 59 of the rotor, depending on the switch configuration.

The spring normally consists of three and one-half turns so that outer end 71 is aligned with inner end 70. In assembling the invention the spring is placed under twisting tension which decreases its diameter slightly and increases its number of turns to nearly three and three-quarters. Outer end 71 of the spring is near the upper end of mounting pin 30 and engages slot 58, in the normally-closed switch position (see Figures 2 and 3). Outer end 71 is at the lower end of mounting pin 30 and engages slot 59 of the rotor, for the normally-open switch position (see Figures 8 and 10). For either type of operation of the switch the melting of the pellet permits the spring to unwind approximately 45 degrees, thus producing the desired switching action.

As clearly shown in Figure 11 pellet E has the form of an elongated, solid cylinder. The shearing stress occurs at a right angle to the longitudinal axis, about mid-way of the cylinder length.

Reference is now made to Figure 13 illustrating an alternative arrangement of the pellet. As shown in Figure 13, the cylindrical housing assembly is provided with a relatively thick wall 81 in which two circumferentially spaced holes or recesses 82 and 83 are provided. The circumferential positions of recesses 82, 83 respectively correspond to the circumferential positions of the hole 21, 22. Rotor B in its peripheral edges 41b, 42b is provided with radial holes or recesses 86, 87 which are substituted for the holes 49, 48, respectively. Pellet E is then positioned with its longitudinal axis extending radially of rotor B, and occupying recesses 83, 86 for the normally closed-switch position as shown, or recesses 82, 87 for the normally open-switch position.

Pellet E is characterized by a sharp, rapid melting action at a predetermined temperature. Pellets having satisfactory characteristics for purposes of the present invention may be obtained, for example, from the Tempil Corporation, of 132 West 22nd Street, New York 11, New York.

One of the most common uses of temperature-sensitive pellets has been to place the pellet on the surface of a metal which is to be heated, and the arrival of the metal at a desired temperature is then determined by visually observing the melting of the pellet. The use of such pellets to oppose a compressive force, so that the melting of the pellet actuates an electrical switch, is of very recent origin. Prior to the inception of the present invention it was not even suspected that the mechanical properties of such temperature-sensitive pellets could be made such as to permit their utilization to reliably resist a shearing force.

While the presently preferred embodiment of the invention utilizes a rotary switching arrangement, it will, nevertheless, be apparent that other forms are possible. For example, a pair of parallel members may be longitudinally movable with respect to each other, rather than movable in a rotary fashion, and may be provided with aligned recesses for retaining the pellet in such a position that it is normally subjected to a shearing force.

Various other modifications of the invention will be readily apparent to those skilled in the art, and it will be understood that the invention is not limited to the details illustrated and described herein except to the extent defined in the following claims.

I claim:

1. In a switch device including a fixed housing assembly, a rotor rotatably supported by said housing assembly for movement from one to another of two possible positions, and electrical contact means carried by said rotor and said housing assembly for making or breaking an electrical circuit, the improvement comprising: a temperature-sensitive pellet disposed within an aligned pair of eccentrically located holes provided in said rotor and said housing assembly for normally retaining said rotor in its initial position; spring means urging said rotor toward its alternate position and applying a shearing force on said pellet; and means for applying heat to raise said pellet to a melting temperature so as to accomplish a unilateral switching action.

2. An electrical switch device comprising: a substantially cylindrical housing assembly having closed ends and a centrally disposed mounting pin; a rotor rotatably supported upon said mounting pin, and adapted to occupy either of two positions; electrical contact means carried by said housing assembly and said rotor, providing an open-circuit condition for one position of said rotor and a closed-circuit condition for the other position of said rotor; a temperature-sensitive pellet occupying an aligned pair of recesses respectively provided in said housing assembly and said rotor eccentric to said mounting pin; spring means urging said rotor toward its alternate position and applying a shearing force on said pellet; and means for applying heat to raise said pellet to a melting temperature.

3. A switch device as claimed in claim 2 which said heat-applying means includes a metal eyelet disposed in one of said recesses and which tightly engages the corresponding end of said pellet.

4. An electrical switch device comprising: a substantially cylindrical housing assembly having closed ends and a centrally disposed mounting pin; a rotor rotatably supported upon said mounting pin and adapted to occupy either of two positions, said housing assembly and said rotor having a first pair of holes respectively formed therein eccentric to said mounting pin which are aligned in one position of said rotor, and a second pair of holes respectively formed therein eccentric to said mounting pin which are aligned in the other position of said rotor; electrical contact means carried by said housing assembly and said rotor and providing an open-circuit condition for one position of said rotor and a closed-circuit condition for the other position of said rotor; a spring engageable with said rotor and said mounting pin in one configuration for the open-circuit position of said rotor, so as to force said rotor toward its closed-circuit position, and engageable in another configuration for the closed-circuit position so as to force said rotor toward its open-circuit position; a temperature-sensitive pellet disposed within the initially aligned holes for normally maintaining said rotor in its initial postion; and means for applying heat to raise said pellet to a melting temperature thereby to permit said spring to force said rotor to its other position; the switching action of said device being of a unilateral nature and in a direction determined by the initially assembled positions of said rotor, said spring, and said pellet.

5. A switch device as claimed in claim 4 in which said pellet is of an elongated cylindrical shape.

6. A switch device as claimed in claim 4 in which said housing assembly and said rotor are made of electrical insulating material.

7. A switch device as claimed in claim 6 in which said heat-applying means includes a metal eyelet disposed in one of said holes and which tightly engages the corresponding end of said pellet.

8. An electrical switch device comprising: a substantially cylindrical housing assembly having closed ends and a centrally disposed mounting pin with a transverse slot therein; a rotor having a double-slotted center hole which receives said mounting pin and adapted to occupy either of two positions, said housing assembly and said rotor having a first pair of recesses respectively formed therein eccentric to said mounting pin which are aligned in one position of said rotor, and a second pair of recesses respectively formed therein eccentric to said mounting pin which are aligned in the other position of said rotor; electrical contact means carried by said housing assembly and said rotor and providing an open-circuit condition for one position of said rotor and a closed-circuit condition for the other position of said rotor; a spring engageable with said mounting pin slot and one of said rotor slots for the open-circuit position of said rotor, so as to force said rotor toward its closed-circuit position, and engageable with said mounting pin slot and the other of said rotor slots for the closed-circuit position so as to force said rotor toward its open-circuit position; a temperature-sensitive pellet disposed within the initially aligned recesses for normally maintaining said rotor in its initial position; and means for applying heat to raise said pellet to a melting temperature thereby to permit said spring to force said rotor to its other position; the switching action of said device being of a unilateral nature and in a direction determined by the initially assembled positions of said rotor, said spring, and said pellet.

References Cited in the file of this patent

UNITED STATES PATENTS

| | | |
|---|---|---|
| 487,519 | Elliot | Dec. 6, 1892 |
| 591,009 | Robinson et al. | Oct. 5, 1897 |
| 1,192,477 | Underwood | July 25, 1916 |
| 1,382,101 | Lofts | June 21, 1921 |
| 1,434,344 | Johnson | Oct. 31, 1922 |
| 1,510,409 | Maybaum | Sept. 30, 1924 |
| 1,611,924 | Lightfoot | Dec. 28, 1926 |
| 2,150,858 | Eggleston | Mar. 14, 1939 |
| 2,307,356 | Birk | Jan. 5, 1943 |
| 2,354,111 | Gardenhour | July 18, 1944 |
| 2,552,331 | Lamb | May 8, 1951 |
| 2,723,325 | Wood | Nov. 8, 1955 |
| 2,764,027 | Otto | Sept. 25, 1956 |
| 2,844,782 | Wentworth | July 22, 1958 |